(12) United States Patent
Kho et al.

(10) Patent No.: US 9,342,434 B2
(45) Date of Patent: May 17, 2016

(54) REVEALING NEW ERRORS IN EDITED CODE

(75) Inventors: Nancy E. Kho, Belmont, MA (US);
Brian D. Arffa, Franklin, MA (US);
David J. Miller, Burlington, MA (US)

(73) Assignee: International Business Machines Corporation, Armonk, NY (US)

( * ) Notice: Subject to any disclaimer, the term of this patent is extended or adjusted under 35 U.S.C. 154(b) by 2162 days.

(21) Appl. No.: 11/928,992

(22) Filed: Oct. 30, 2007

(65) Prior Publication Data

US 2009/0113393 A1    Apr. 30, 2009

(51) Int. Cl.
*G06F 9/45* (2006.01)
*G06F 11/36* (2006.01)

(52) U.S. Cl.
CPC .............. *G06F 11/3604* (2013.01); *G06F 8/41* (2013.01)

(58) Field of Classification Search
None
See application file for complete search history.

(56) References Cited

U.S. PATENT DOCUMENTS

| | | | | |
|---|---|---|---|---|
| 5,845,120 | A * | 12/1998 | Reddy et al. | 717/125 |
| 6,662,359 | B1 * | 12/2003 | Berry et al. | 717/130 |
| 7,219,338 | B2 * | 5/2007 | Venter | 717/140 |
| 7,340,726 | B1 * | 3/2008 | Chelf et al. | 717/126 |
| 7,469,375 | B2 * | 12/2008 | Anand et al. | 714/799 |
| 7,519,964 | B1 * | 4/2009 | Islam et al. | 717/177 |
| 2004/0103406 | A1 * | 5/2004 | Patel | 717/140 |
| 2006/0161903 | A1 * | 7/2006 | Anand et al. | 717/132 |

* cited by examiner

*Primary Examiner* — Issac T Tecklu
(74) *Attorney, Agent, or Firm* — Edward Choi; Hoffman Warnick LLC

(57) ABSTRACT

Under the present invention, a first (e.g., unedited) set of code will be compiled and analyzed to produce a first set of results that includes a set of errors. A second set of code, which represent an edited version of the first set of code will be compiled and analyzed to produce a set of results that includes another set of errors. Thereafter, the second set of errors will be filters so that errors appearing from the compilation and analysis of the first set of code are excluded. This filtered set of errors can than be presented to the user. The present invention will leverage, among other things, a static code analyzer and a filtering tool to achieve these results.

16 Claims, 2 Drawing Sheets

REVEALING NEW ERRORS IN EDITED CODE

FIELD OF THE INVENTION

In general, the present invention relates to error detection. Specifically, the present invention relates to an approach for revealing new errors (errors not previously apparent) in edited program code.

BACKGROUND OF THE INVENTION

Static code analysis tools are commonly used by software engineers to analyze code and identify problems early on in the development cycle. Static code analyzers can be run against a single file, a collection of files within a project, or even an entire build. However, even when run against a single file, the number of results returned can be overwhelming. A single file may generate as many as hundreds or thousands of errors, especially when the code examined is large, old, and/or complex. Some of these reported complaints may be irrelevant or of no interest to the developer. For legacy code, there is a risk of introducing regressions if a user tries to "fix" tool reported potential problems, another drawback of returning all results. For example, a developer may not be interested in all the results, but only the ones related to his or her own code changes. Currently, there is no easy solution that allows a developer to view only those results related to his or her changes.

Static code analysis tools have been around for quite a few years. However, none of these tools allow the user to focus only on the problems introduced by his or her code changes. For example, such tools can be run against entire code files, but not on new changes only. Thus, the developer is forced to view an entire set of errors instead of new errors. In view of the foregoing, there exits a need for an approach that solves at least one of the above-referenced deficiencies.

SUMMARY OF THE INVENTION

The present invention allows new errors in edited code to be easily detected/revealed. Specifically, under the present invention, a first (e.g., unedited) set of code will be compiled and analyzed to produce a first set of results that includes a set of errors. A second set of code, which represent an edited version of the first set of code will be compiled and analyzed to produce a set of results that includes another set of errors. Thereafter, the second set of errors will act as filters so that errors appearing from the compilation and analysis of the first set of code are excluded. This filtered set of errors can than be presented to the user. The present invention will leverage, among other things, a static code analyzer and a filtering tool to achieve these results.

A first aspect of the present invention provides a method for revealing new errors in edited code, comprising: performing a compilation of a first set of code to produce a first set of results; performing a compilation of a second set of code to produced a second set of results, the second set of code being an edited version of the first set of code; and comparing the first set of results to the second set of results to reveal a set of errors that are exclusive to the second set of results.

A second aspect of the present invention provides a system for revealing new errors in edited code, comprising: a module for performing a compilation of a first set of code to produce a first set of results; a module for performing a compilation of a second set of code to produced a second set of results, the second set of code being an edited version of the first set of code; and a module for comparing the first set of results to the second set of results to reveal a set of errors that are exclusive to the second set of results.

A third of the present invention provides a program product stored on a computer readable medium for revealing new errors in edited code, the computer readable medium comprising program code for causing a computer system to: perform a compilation of a first set of code to produce a first set of results; perform a compilation of a second set of code to produced a second set of results, the second set of code be an edited version of the first set of code; and compare the first set of results to the second set of results to reveal a set of errors that are exclusive to the second set of results.

A fourth of the present invention provides a method for deploying a system for revealing new errors in edited code, comprising: deploying a computer infrastructure being operable to: perform a compilation of a first set of code to produce a first set of results; perform a compilation of a second set of code to produced a second set of results, the second set of code be an edited version of the first set of code; and compare the first set of results to the second set of results to reveal a set of errors that are exclusive to the second set of results.

A fifth of the present invention provides a data processing system for revealing new errors in edited code, comprising: a memory medium having instructions; a bus coupled to the memory medium; and a processor coupled to the memory medium that when executing the instructions causes the data processing system to perform a compilation of a first set of code to produce a first set of results; perform a compilation of a second set of code to produced a second set of results, the second set of code be an edited version of the first set of code; and compare the first set of results to the second set of results to reveal a set of errors that are exclusive to the second set of results.

A sixth of the present invention provides a computer-implemented business method for revealing new errors in edited code, comprising: perform a compilation of a first set of code to produce a first set of results; perform a compilation of a second set of code to produced a second set of results, the second set of code be an edited version of the first set of code; and compare the first set of results to the second set of results to reveal a set of errors that are exclusive to the second set of results.

BRIEF DESCRIPTION OF THE DRAWINGS

These and other features of this invention will be more readily understood from the following detailed description of the various aspects of the invention taken in conjunction with the accompanying drawings in which.

Figure 1:
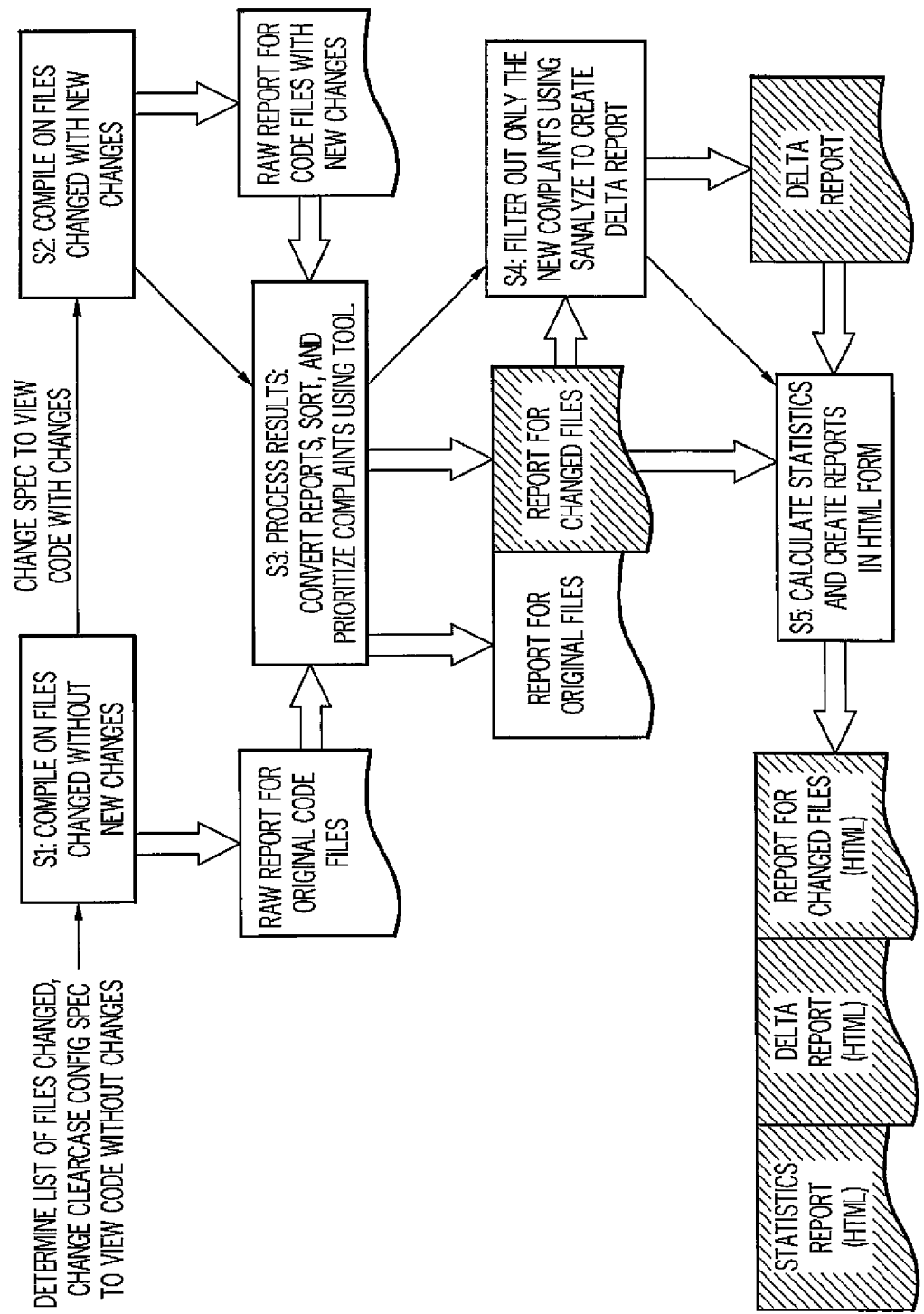
FIG. 1 depicts a method flow diagram according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following Sections:
I. General Description
II. Computerized Implementation I. General Description As indicated above, the present invention allows new errors in edited code to be easily detected/revealed. Specifically, under the present invention, a first (e.g., unedited) set of code will be compiled and analyzed to produce a first set of results that includes a set of errors. A second set of code, which represent an edited version of the first set of code will be compiled and analyzed to produce a set of results that includes another set of errors. Thereafter, the second set of errors will act as filters so that errors appearing from the compilation and analysis of the first set of code are excluded. This filtered set of errors can than be presented to the user. The present invention will leverage, among other things, a static code analyzer and a filtering tool to achieve these results.

The present approach allows a user to easily view static code analysis results related to the new code changes only. It assumes the use and leverage of a source control system. It also leverages a static code analysis tool and specialized differentiation/filtering tool.

The present invention can be implemented in any number of ways. One way is as a tool separate from the static code analysis tool, or as a special new feature of the static code analysis tool used. If the invented tool is a stand-alone tool, the results could either be stored in the same format as that of the static code analysis tool, or in a different, more consumable format. In the case that the invention is implemented as a part of the static code analysis tool used, the results of the invented tool would be displayed in the normal fashion of the static code analysis tool. By merely executing the invented tool within his or her development environment and without any additional input data, the user can easily obtain static code analysis results that are related to the new code changes only. In any event, along these lines, the present approach could generally be implemented given the use of any static code analysis tool, source control system, and specialized analysis differentiation tool that either can be invoked from the same interface, such as a command prompt, or can be interfaced with each other.

In any case, the tool can be executed from an environment that can take advantage of the source control system. If the tool is implemented separately from the static code analysis tool, the user can execute the tool, either by clicking on its corresponding icon or through invocation on the command line. The tool should then run, and display the results or where the results can be found. If the tool is a part of the static code analysis tool, then the static code analysis tool will need to supply a feature, such as a simple checkbox, that allows the user to indicate whether he or she would like to see all the static code analysis results reported, or only the new results. The user should be able to obtain the new results for the new code only by choosing the checkbox and then running the static code analyzer as he or she normally would. The static code analyzer tool then displays only the new results in its normal fashion. In a typical embodiment, the static code analysis tool can be or utilize BEAM, which is commercially available from IBM Corp. of Armonk, N.Y. (BEAM and related terms are trademarks of IBM Corp. in the United States and/or other countries). In addition, the differentiation tool can be Sanaylze, which is commercially available from IBM Corp of Armonk, N.Y. (Sanalyze and related terms are trademarks of IBM Corp. in the United States and/or other countries).

One way this invention could be implemented would require code that carries out the following basic steps. First, execute the appropriate source control system command to determine what files were changed. Second, execute the appropriate source control system command to get a view of the original file(s) before changes were applied. Third, run the static code analysis tool. Fourth, execute the appropriate source control system command to get a view of the file(s) with the new changes. Fifth, run the static code analysis tool against this version of the file(s). Sixth, run a specialized diff tool to find the new errors introduced. Last, the static code analysis tool displays the results. This solution assumes that the static code analysis tool and the diff tool work with the same format for storing the results. However, if they work with different formats, code could be written to easily translate from one format to the other or for each format to/from a common format, before steps six and seven. Step one could be altered to also allow the user to specify a single file or subset of files to analyze instead of automatically choosing all changed files.

These and other steps are summarized in the flow diagram of FIG. 1. As depicted, in step S1 a first set of code is compiled and analyzed by the static code analyzer to produce a set of results that can be formatted into a "raw" report. The set of results can include a set of errors. Thereafter, a second set of code that represents an edited version of the first set of code is also compiled and analyzed to produce a set of results that can be formatted into another "raw" report. Similarly, this set of results will include a set of errors. However, this set of errors can include those that were present in the compilation and analysis of the first set of code, as well as new errors due to the code edits.

It should be understood that in performing steps S1 and S2, a determination of what files in the code were edited can first be performed. That is a tool such as ClearCase, which is commercially available from IBM Corp. of Armonk, N.Y., can be used for source control (ClearCase and related terms are trademarks of IBM Corp. in the United States and/or other countries). In general, ClearCase used a configuration specification to determine what version of the files is viewed. Along these lines, before S1, the ClearCase configuration specification is modified so that files are viewed without the new code changes. Before S2 the ClearCase configuration specification is modified so that files are viewed with the new code changes applied. With the ClearCase command "lsgeta", the list of changed files can be determined.

In any event, in S3, the sets of results will be processed, and reports will be formatted so that the new errors can be filtered out (by a differentiation/filtering tool) and presented in S4. That is, the user/developer will only will only be presented with the new errors. The resulting product can be generation of a set of delta reports. In S5, a script (e.g., written in Perl) can be run to process the CSV files in order to calculate the statistics and to create additional reports viewable as HTML. The HTML and CSV reports can be saved on the user's local development machine and presented to the user. There is typically a report for just the new complaints introduced by the new code, as well as a report for all complaints for the files changed.

II. Computerized Implementation

Figure 2:
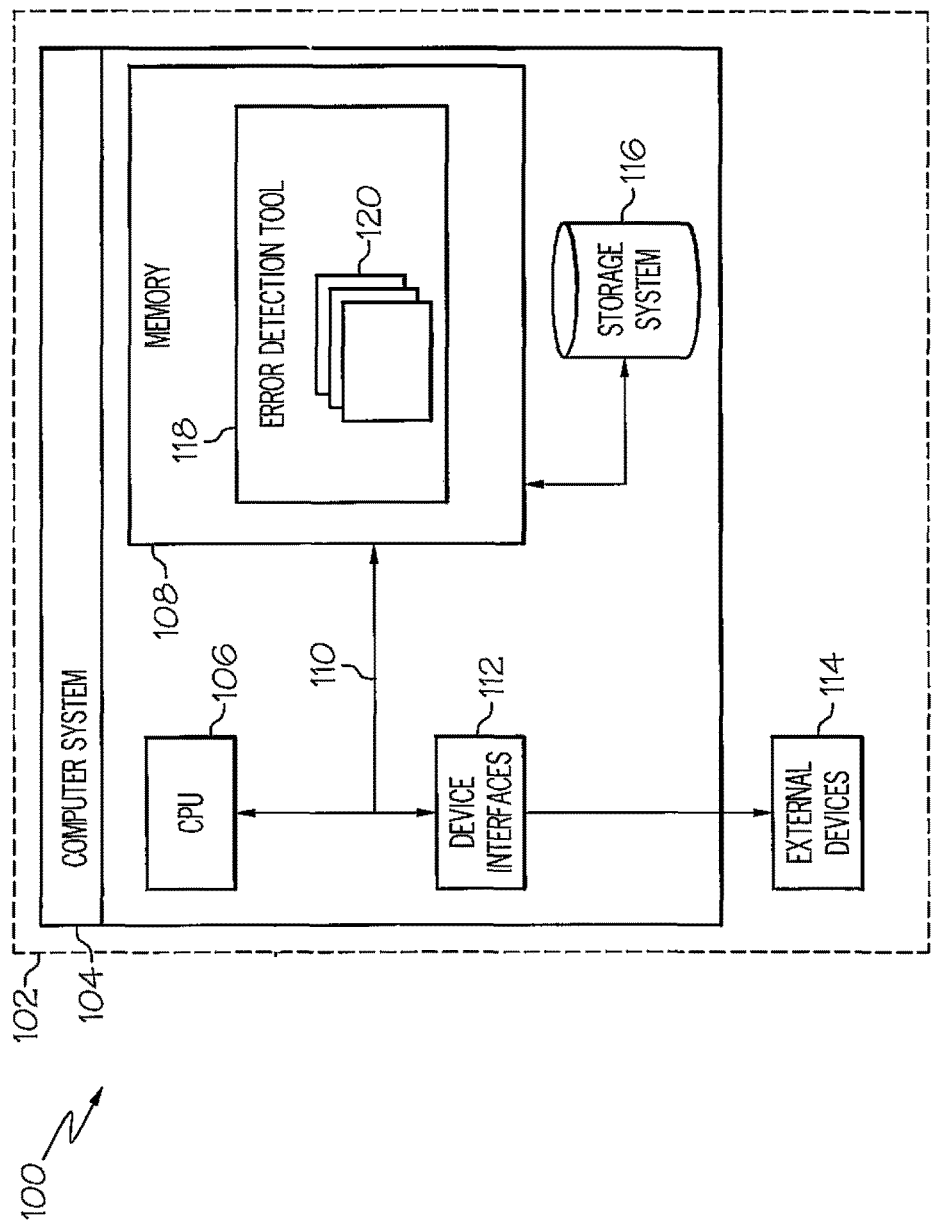
FIG. 2 depicts a more specific computerized implementation according to the present invention.

Referring now to FIG. 2, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and device interfaces 112. Further, computer system 104 is shown having external devices 114 and storage system 116 that communicate with bus via device interfaces 112. In general, processing unit 106 executes computer program code, such as error detection tool 120, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system could also include I/O interfaces that communicate with: one or more external devices such as a kiosk, a checkout station, a keyboard, a pointing device, a display, etc.); one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices. Still further, it is understood that one or more additional components (e.g., system software, math co-processing unit, etc.) not shown in FIG. 2 can be included in computer system 104.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is error detection tool 118, with a set of modules 120. The modules generally provide the functions of the present invention as described herein. It should be understood that error detection tool can actually comprise one or more programs that are integrated and/or or work in conjunction with one another. Examples of such programs include a static code analyzer and a differentiation/filtering program (as mentioned above). In any event, set of modules 120 is configured to perform all functions described herein such as (among others): performing a compilation of a first set of code to produce a first set of results; performing a compilation of a second set of code to produced a second set of results, the second set of code being an edited version of the first set of code; comparing the first set of results to the second set of results to reveal a set of errors that are exclusive to the second set of results; filtering out the set of errors from the second set of results; and outputting a set of reports.

While shown and described herein as an approach to reveal new errors (program) code, it is understood that the invention further provides various alternative embodiments. For example, in one embodiment, the invention provides a computer-readable/useable medium that includes computer program code to enable a computer infrastructure to reveal new errors (program) code kout. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 2) and/or storage system 116 (FIG. 2) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to reveal new errors (program) code. In this case, the service provider can create, maintain, support, etc., a computer infrastructure, such as computer infrastructure 102 (FIG. 2) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for revealing new errors (program) code. In this case, a computer infrastructure, such as computer infrastructure 102 (FIG. 2), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 2), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for revealing new errors in edited code, comprising:
   performing a compilation of a first set of code to produce a first set of results, wherein the first set of results includes at least one error;
   performing a compilation of a second set of code to produce a second set of results, the second set of code being an edited version of the first set of code, wherein the second set of results includes the at least one error included in the first set of results and at least one error not present in the first set of results;
   comparing the first set of results to the second set of results to filter out the at least one error that is not present in the first set of results and is present in the second set of results; and
   presenting to a user only the at least one error that is not present in the first set of results and is present in the second set of results.

2. The method of claim 1, further comprising outputting a set of reports.

3. The method of claim 2, the outputting comprising:
   outputting a first report containing the first set of results;
   outputting a second report containing the second set of results; and
   outputting a third report containing the set of errors.

4. The method of claim 1, the performing the compilation of the first set of code comprising analyzing the compilation of the first set of code to produce the first set of results, and the performing the compilation of the second set of code comprising analyzing the compilation of the second set of code to produce the second set of results.

5. The method of claim 1, the first set of code comprising a first set of files and the second set of code comprising a second set of files, the second set of files comprising at least one file that is an edited version of the first set of files.

6. A system for revealing new errors in edited code, comprising:
   a computer system, including: memory and storage
   a module for performing a compilation of a first set of code to produce a first set of results, wherein the first set of results includes at least one error;
   a module for performing a compilation of a second set of code to produce a second set of results, the second set of code being an edited version of the first set of code, wherein the second set of results includes the at least one error included in the first set of results and at least one error not present in the first set of results;
   a module for comparing the first set of results to the second set of results to filter out the at least one error that is not present in the first set of results and is present in the second set of results; and
   a module for presenting to a user only the at least on error that is not present in the first set of results and is present in the second set of results.

7. The system of claim 6, further comprising a module for outputting a set of reports.

8. The system of claim 7, the outputting comprising:
   a module for outputting a first report containing the first set of results;
   a module for outputting a second report containing the second set of results; and
   module for outputting a third report containing the set of errors.

9. The system of claim 6, the module for performing the compilation of the first set of code being configured to analyze the compilation of the first set of code to produce the first set of results, and the module for performing the compilation of the second set of code being configured to analyze the compilation of the second set of code to produce the second set of results.

10. The system of claim 6, the first set of code comprising a first set of files and the second set of code comprising a second set of files, the second set of files comprising at least one file that is an edited version of the first set of files.

11. A program product stored on a non-transitory computer readable medium for revealing new errors in edited code, the computer readable medium comprising program code for causing a computer system to:
   perform a compilation of a first set of code to produce a first set of results, wherein the first set of results includes at least one error;
   perform a compilation of a second set of code to produce a second set of results, the second set of code be an edited version of the first set of code, wherein the second set of results includes the at least one error included in the first set of results and at least one error not present in the first set of results;

compare the first set of results to the second set of results to filter out the at least one error that is not present in the first set of results and is present in the second set of results; and present to a user only the at least on error that is not present in the first set of results and is present in the second set of results.

12. The program product of claim 11, the computer readable medium comprising program code for causing the computer system to output a set of reports.

13. The program product of claim 12, the computer readable medium comprising program code for causing the computer system to comprising:

output a first report contain the first set of results;
output a second report contain the second set of results; and
output a third report contains the set of errors.

14. The program product of claim 11, the computer readable medium comprising program code for causing the computer system to analyze the compilation of the first set of code to produce the first set of results, and to analyze the compilation of the second set of code to produce the second set of results.

15. The program product of claim 11, the first set of code comprising a first set of files and the second set of code comprising a second set of files, the second set of files comprising at least one file that is an edited version of the first set of files.

16. A method for deploying a system revealing new errors in edited code, comprising:

deploying a computer infrastructure being operable to:

perform a compilation of a first set of code to produce a first set of results, wherein the first set of results includes at least one error;

perform a compilation of a second set of code to produce a second set of results, the second set of code be an edited version of the first set of code, wherein the second set of results includes the at least one error included in the first set of results and at least one error not present in the first set of results;

compare the first set of results to the second set of results to filter out the at least one error that is not present in the first set of results and is present in the second set of results; and present to a user only the at least on error that is not present in the first set of results and is present in the second set of results.

\* \* \* \* \*